United States Patent Office 2,866,687
Patented Dec. 30, 1958

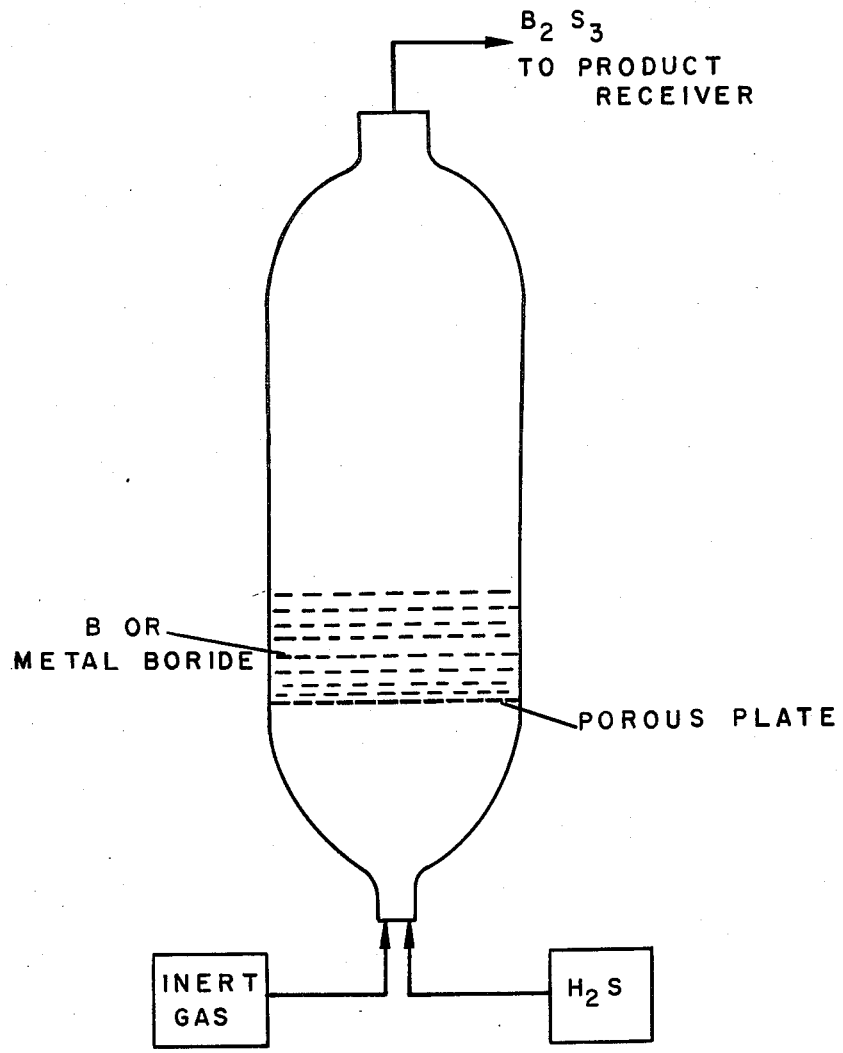

2,866,687

PROCESS FOR THE PREPARATION OF BORON TRISULFIDE

Paul E. Snyder, Pittsburgh, Pa., assignor to Callery Chemical Company, Pittsburgh, Pa., a corporation of Pennsylvania Application December 21, 1955, Serial No. 554,589

3 Claims. (Cl. 23—206)

This invention relates to a process for the preparation of boron trisulfide. More particularly, it relates to a fluidized bed process for preparing this compound by the reaction of boron, iron boride, or calcium boride with hydrogen sulfide or sulfur in the presence of an inert gas.

Boron trisulfide was first prepared in 1824 by Berzelius who mixed amorphous boron with sulfur vapor. Later, several investigators prepared $B_2S_3$ by passing dry $H_2S$ over boron powder heated in a furnace. This compound has also been prepared by heating boron and lead sulfide. Other methods of preparation include: (1) the reaction of $CS_2$ with $B_2O_3$ and carbon black (2) the reaction of $B_2O_3$ and $Al_2S_3$ (3) the reaction of $H_2S$ with a solution of $BBr_3$ in $CS_2$ or $C_6H_6$ at room temperature (4) the reaction of iron boride with $H_2S$ at about 400° C. By using these methods, it is possible to prepare small amounts of boron trisulfide but the yields are extremely low and considerable sintering occurs which makes separation of the desired product very difficult. The entire problem of preparation was therefore re-investigated in order to develop a process which would be economical to use for preparing large amounts of pure boron trisulfide.

It is one object of this invention to provide a new and improved process for preparing pure boron trisulfide.

Another object is to provide a fluidized bed process for preparing boron trisulfide in substantial yield.

A still further object is to provide an economical process for preparing boron trisulfide which circumvents the sintering and separation difficulties inherent in the prior art processes.

Other objects will appear from time to time throughout the following specification and appended claims.

This new and improved process for preparing boron trisulfide will be more fully described hereinafter and the novelty thereof will be particularly pointed out and distinctly claimed.

In the accompanying drawing there is shown a diagrammatic view of the apparatus used to carry out this process.

This invention is based upon the discovery that boron trisulfide can be prepared in good yields by passing a mixture of hydrogen sulfide and an inert gas through a fluidized bed of powdered solid reactants such as boron or a metal boride such as calcium boride or iron boride. The solid reactants may be used alone or mixed with powdered carbon or graphite. The mixture is placed in a vertical furnace and heated to about 700° C. The powdered mixture is fluidized by the inert gas which may be argon, hydrogen, nitrogen and the like. The boron trisulfide formed passes out the top of the furnace and is collected in a suitable receiver. In this manner, the sintering and separation problems of the prior art processes are avoided and higher yields of boron trisulfide result. The reactions which take place in the furnace may be illustrated as follows:

(1) $\quad 2B+3H_2S \rightarrow B_2S_3+3H_2$ (2) $\quad FeB_2+4H_2S \rightarrow B_2S_3+FeS+4H_2$ (3) $\quad CaB_6+10H_2S \rightarrow 3B_2S_3+CaS+10H_2$ Boron trisulfide can also be produced by using elemental sulfur in place of $H_2S$ in the above reactions. However, the use of sulfur at high temperatures is clumsy and difficult. Furthermore, when sulfur is used some of it tends to carry over and contaminate the product. The use of $H_2S$ is preferred since it gives a much better and more clean-cut reaction.

The apparatus which was employed to investigate the fluidized bed technique of preparing boron trisulfide consisted of a vertical tube furnace with a 4½" bore. The reaction tube itself was made of porcelain with a 3" bore for a length of 15" and a 3¾" bore for a length of 5". The walls of the reaction tube were ¼" thick. A porous, carborundum disk 3½" in diameter and ½" thick was cemented inside of the reaction tube against the ledge formed by the change in bore size. A glass tapered joint was cemented to the bottom of the reaction tube which was connected by means of a glass T-tube to an $H_2S$ tank and an inert gas supply. A similar joint was attached to the top of the reaction tube which was connected to a 3 ft. length of 100 mm. glass tubing where the furnace product collected.

In one experiment using the apparatus described, boron trisulfide was prepared as follows: the reaction tube was loaded with about 30 g. of amorphous boron mixed with 25–50% by volume of carbon. The carbon was used to prevent sintering. The bed was then fluidized by passing argon through the boron-carbon mixture. When the temperature of the furnace reached 700° C., the $H_2S$ gas was introduced. An induction period which lasted about one hour was observed. During this time a considerable amount of sulfur formed which condensed on the walls of the system before reaching the receiver. After the formation of sulfur ceased, $B_2S_3$ passed out the top of the furnace in a thick, dense white cloud which deposited on the cool walls of the receiver. In about 3 hours about 15 g. of crude $B_2S_3$ had formed. The crude product was sublimed under vacuum at 250° C. The sublimer consisted of a flat bottom vessel about 100 mm. in diameter. A cold finger extended to within 1" of the bottom of the vessel. The sublimate condensed on the outer surface of the cold finger as a snow-white solid. Analysis of the solid sublimate for sulfur and boron confirmed the fact that it was substantially pure boron trisulfide.

In another experiment, the reaction tube was charged with about 30 g. of calcium boride mixed with about 50% by volume of graphite. The mixture was fluidized with nitrogen and heated to 900° C. $H_2S$ gas was then passed through the heated mixture for about 4 hours. An induction period of about 1 hour was first observed during which time elemental sulfur was evolved. After the evolution of sulfur ceased, dense white fumes were observed leaving the top of the furnace which condensed in the receiver. The crude boron trisulfide formed was purified by sublimation under vacuum at 250° C. Conventional analyses for sulfur and boron showed that the compound was $B_2S_3$ of high purity.

Other experiments in which iron boride, calcium boride and amorphous boron respectively were placed in the reactor and fluidized with hydrogen in the absence of carbon or graphite resulted in the formation of boron trisulfide when treated with hydrogen sulfide at temperatures from 400° to 900° C. In these experiments it was found that iron boride in particular had a tendency to sinter which would stop the reaction. Thus, amorphous boron or calcium boride mixed with carbon or graphite are the preferred reactants. It was also found that a reaction temperature from 400° C. to 900° C.

could be used and that the higher temperature gave a faster reaction. The lower temperature produced beautiful white crystals but the yield was lower. A reaction temperature of about 700° C. is therefore preferred since better yields with little or no contamination of the product with sulfur are readily obtained. Several experiments using $H_2S$ gas to fluidize the mixture as well as to react were not satisfactory. When an inert gas was mixed with the $H_2S$ gas, most of the fluidizing was done by the inert gas thus leaving the $H_2S$ to react with the fluidized bed. Other experiments showed that when boron or a metal boride were fluidized with an inert gas and reacted with gaseous sulfur, boron trisulfide was formed.

Although several embodiments of this invention have been described, it will be apparent to those skilled in the art that other variations are possible. It should, therefore, be understood that within the scope of the appended claims, this invention may be practiced otherwise than as specifically described.

What is desired to be claimed and secured by Letters Patent of the United States is:

1. A process for preparing boron trisulfide which comprises fluidizing a mixture of calcium boride and carbon with an inert gas, heating said mixture to about 900° C., passing hydrogen sulfide through the fluidized mixture and recovering the boron trisulfide evolved.

2. A process according to claim 1 in which the crude boron trisulfide formed is purified by sublimation under vacuum at 250° C.

3. A process for preparing substantially pure boron trisulfide which comprises passing an inert gas through a bed of powdered solid calcium boride to fluidize said bed, then reacting the fluidized bed with a material selected from the group consisting of hydrogen sulfide and sulfur at a temperature of about 400° to 900° C. and recovering the boron trisulfide thus formed.

References Cited in the file of this patent

UNITED STATES PATENTS

| | | |
|---|---|---|
| 2,480,639 | Ferguson | Aug. 30, 1949 |
| 2,631,921 | Odell | Mar. 17, 1953 |
| 2,700,592 | Heath | Jan. 25, 1955 |

OTHER REFERENCES

Mellor: "Treatise on Inorganic and Theoretical Chemistry" (1924), vol. 5 (Part 1), pages 142, 143.